July 5, 1966  T. FAULHABER  3,259,017
DIMMING REAR-VIEW MIRROR CONTAINING LIGHT ABSORBING
LIQUID AND HAVING PUMP MEANS
Filed Sept. 19, 1962  3 Sheets-Sheet 3
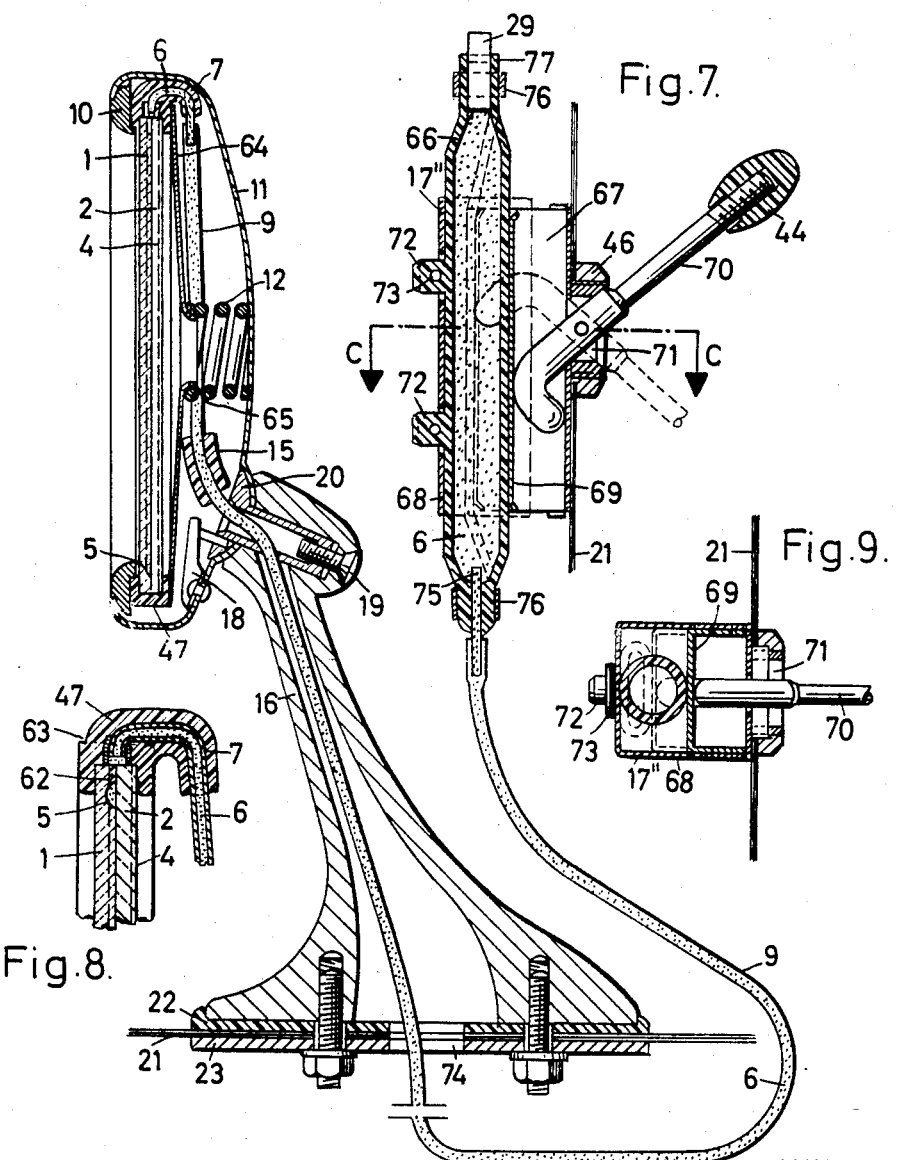
INVENTOR:
TILLO FAULHABER
By Kurt Kelman
agent

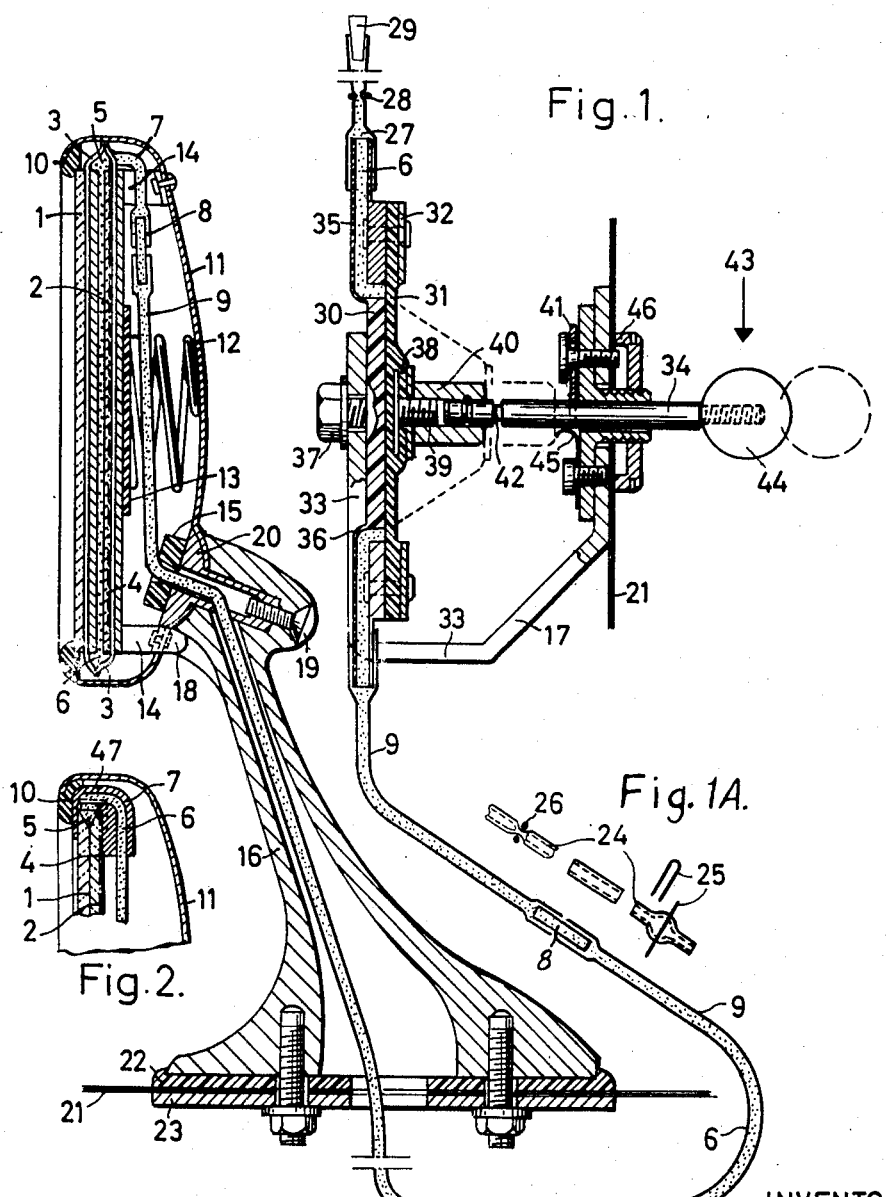

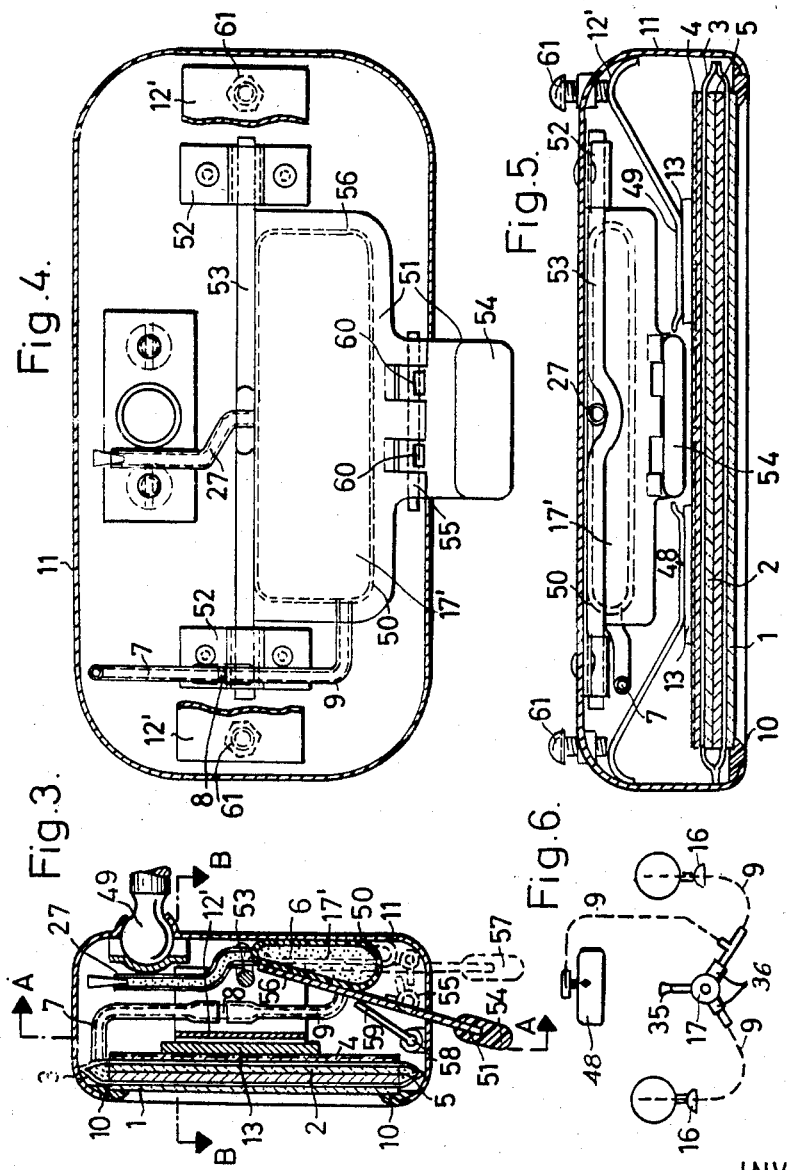

United States Patent Office

3,259,017
Patented July 5, 1966

3,259,017
DIMMING REAR-VIEW MIRROR CONTAINING LIGHT ABSORBING LIQUID AND HAVING PUMP MEANS
Tillo Faulhaber, 34 Ulmenstrasse,
Frankfurt am Main, Germany
Filed Sept. 19, 1962, Ser. No. 224,865
Claims priority, application Germany, Sept. 20, 1961,
B 64,063
12 Claims. (Cl. 88—77)

This invention relates to mirrors, especially for motor vehicles, which can be dimmed to avoid blinding of the driver by reflected light. Known mirrors of this type have a reflecting mirror plate and a transparent clear-view plate in normally parallel arrangement. An electrically or mechanically operated mechanism pivots the mirror plate for dimming. The dimmed image becomes visible on the clear-view plate.

In the hinged mirrors briefly described above, the reflected image is deflected from the line of sight of the driver only through a small angle. Thus there is danger of his eyes still meeting the blinding reflected image. Furthermore, dimming is not possible by daylight. Use of such a mirror on the outside of the vehicle is also precluded for the above-mentioned reasons. A further disadvantage of the hinged mirror is its sensitivity to moisture condensed between mirror and clear-view plate.

The invention avoids the disadvantages of the above-described known mirrors. In the mirror of the invention, a space of variable thickness is enclosed by the clear-view and mirror plates. The space is sealed against the atmosphere and contains a liquid which completely absorbs the image reflected from the mirror plate when the mirror is set for dimming. The space between the plates communicates through a conduit with a source of pressure and/or suction such as a pump.

When the pump is actuated, the radiation-absorbing liquid is forced between the mirror plate and the clear-view plate and absorbs the image reflected from the mirror plate. A dimmed picture appears on a surface of the clear-view plate arranged parallel with the plane of the mirror plate. The substantially brighter mirror image becomes visible again when the liquid between mirror plate and clear-view plate is forced into the pump or is drawn away by the pump. In this state of the mirror, the mirror plate and clear-view plate abuttingly engage one another, leaving not more than an extremely thin invisible film of liquid therebetween.

It is a further advantage of this invention that one pump can simultaneously dim several mirrors present on one motor vehicle.

The maximum thickness of the liquid layer required for complete absorption of the mirror image may amount to about 0.3 to 0.5 mm. Smaller thicknesses of the liquid may be used with a corresponding increase of its absorptive capacity, and more stringent requirements regarding the surface finish of the mirror and clear-view plates.

In order to avoid air bubbles between the plate surfaces the conduit to the pump communicates with the space between the plates at its upper end. The internal volume of the conduit is preferably smaller than the maximum volume of liquid space between the mirror and clear-view plates. When the pump is actuated, air bubbles pass into the pump space, where they are harmless.

The conduit may consist of a flexible pipe which passes through the mirror holder and opens into an outwardly sealed enlarged flexible pipe which may be compressed longitudinally by a clamp or the like to act as a pump.

If the plates consist of glass layers laminated by means of an interposed foil, a seal between the plates can be provided by welding or adhesively bonding the lamination foils which are made to extend beyond the edges of the glass layers.

Other features and many of the attendant advantages of this invention will be readily appreciated as the same becomes better understood from the following detailed description of preferred embodiments when considered in connection with the appended drawings in which:

FIG. 1 shows a mirror of the invention in side-elevational section;
FIG. 1A illustrates a detail of the device of FIG. 1 in the disassembled condition;
FIG. 2 shows a modified detail of the mirror of FIG. 1;
FIG. 3 illustrates another mirror of the invention in side-elevational section;
FIG. 4 shows the mirror of FIG. 3 in front-elevational section on the line A—A;
FIG. 5 is a sectional plan view of the mirror of FIG. 3 taken on the line B—B;
FIG. 6 diagrammatically illustrates an assembly combining two mirrors of the type shown in FIG. 1 with one closely similar to the device illustrated in FIGS. 3 to 5;
FIG. 7 shows yet another mirror of the invention in a side-elevational sectional view;
FIG. 8 shows a modified detail of the mirror of FIG. 7;
FIG. 9 shows a portion of the device of FIG. 7 in plan section on the line C—C.

In the mirror illustrated in FIGURE 1, which is mounted on the outside of a vehicle, the clear-view plate 1 and the mirror plate 2 each consists of two transparent layers laminated with an interposed foil 3, and respective layers of the plates are sealed in an envelope formed by the peripherally welded foils 3. The mirror plate 2 has a reflecting coating 4 arranged in contact with the corresponding foil 3, so that the mirror coating 4 does not require a special protective covering. Light is re-reflected from the coating 4 to the exterior and interior of the mirror housing 11. Thus it is possible if desired to reverse the position of the clear-view plate and mirror plate, and to use the mirror without dimming device.

The foils 3 form a peripheral liquid-distribution channel 5, through which light absorbing liquid 6 can rapidly pass from the periphery into a space between the clear-view plate 1 and the mirror plate 2. At the highest point, the channel 5 is tightly connected through a foil 3 with a feed pipe 7. A coupling 8 connects the feed pipe 7 to a flexible pipe 9. The clear-view plate 1 and mirror plate 2 are urged against a resilient ring 10 arranged about an opening in the mirror housing 11 by a spiral spring 12 which exerts pressure upon the mirror plate 2. The mirror plate is protected against scratching by a cork pad 13 on the spring 12. Three spacers 14 arranged uniformly about the periphery of the housing 11 hold the clear-view plate 1 and mirror plate 2 parallel at maximum thickness of an interposed liquid layer.

The pipe 9 is secured in the housing 11 by a rubber ring 15. The pipe extends through tthe mirror bracket 16 to a pump 17 which is normally secured on the dashboard.

Stop pins 18 on the mirror bracket 16 and on the mirror housing 11 prevent rotation of the mirror housing through more than 340 degrees on a pivot which connects the mirror housing to the mirror bracket and includes a screw 19 for tightening a hollow pivot pin 20. The mirror bracket is firmly screwed to the body 21 of the vehicle, a rubber pad 22 and a retaining plate 23 preventing damage to the latter.

Since the dimming mirror and pump 17 must be mounted separately, a further coupling 8 in the pipe 9 near the pump 7 is necessary. If the liquid 6 is already situated in the dimming mirror and pump, the latter coupling is assembled as shown in FIG. 1A.

The free-ends 24 of the flexible pipe are closed by clips 25 and 26, the pipe ends 24 are pushed on to the coupling 8, the clip 26 is removed, the air enclosed between the clips 25 and 26 is conducted into the pump 7, and is let off through a flexible air-discharge pipe 27. For this purpose, a clip 28 on the pipe 27 is loosened so that the air passes into the piece of the flexible pipe 27 between the clip 28 and a stopper 29. After closing of the clip 28, the stopper 29 can be opened and if necessary light-absorbing liquid 6 can be added to replace the air. Then the clip 25 is removed and the dimming mirror is ready for operation.

A pump 17 consists essentially of a rigid base plate 30, a rubber diaphragm 31, a loose flange 32, a retaining yoke 33 and an operating rod 34. The plate 30 is made of plastic and carries a filling and air-discharge nozzle 35 at its highest point. Two outlet pipes 36 of which only one is shown in FIG. 1 whereas the other one is not being used in the illustrated device are arranged at the plate bottom, and are offset by about 30° from the vertical in opposite directions. Eight screws or rivets distributed uniformly on the periphery of the plate 30 secure the rubber diaphragm 31 and the flange 32. The plate 30 is held to the yoke 33 by a nut 37. The center of the rubber diaphragm 31 is vulcanized to a metal plate 38 carrying an outwardly extending threaded pin 39. An internally threaded sleeve 40 connects the threaded pin 39 with the operating rod 34 which is rotatably mounted on the sleeve.

When the knob 44 on the operating rod 34 is drawn back, a vertically movable retaining plate 41 on the yoke 33 engages a groove 42 on the rod 34. The withdrawal of the operating rod 34 causes the light-absorbing liquid 6 to be drawn from the space between clear-view plate 1 and mirror plate 2 into the pump 17. The dimming mirror is in its highly reflective state. Dimming is effected by slight pressure upon the knob 44 in the direction of the arrow 43. This causes a spring 45 to be pressed so far downwards that the plate 41 releases the groove 42. The resiliency of the rubber diaphragm 31 forces the light-absorbing liquid 6 back between clear-view plate 1 and mirror plate 2. The mirror is thereby dimmed. Dimming and undimming take place rapidly. The pump 17 is secured by a nut 46 to the vehicle body 21.

In FIGURE 2 there is shown a modified mirror in which the clear-view plate 1 and mirror plate 2 are peripherally connected by a sealing composition 47 based upon a synthetic rubber of the polysulfide type. The mirror is shown in its highly reflecting state in which the plates 1 and 2 are in contact substantially over the entire area of their opposite faces.

FIGS. 3 to 5 show a mirror with built-in pump for mounting in a vehicle.

The clear-view plate 1 and a mirror plate 2 are sealed against penetration of the external atmosphere therebetween by a welded or adhesively bonded foil envelope 3. The mirror coating 4 is situated on the back of the mirror plate 2. The clear-view plate 1 and mirror plate 2 are surrounded by a peripheral channel 5 formed by the foils 3. A feed pipe 7 equipped with a coupling 8 and a flexible pipe 9 connect the channel 5 with a pump 17.

The clear-view plate and mirror plate are held against a resilient ring 10 in the mirror housing 11 by a leaf spring 12'. The leaf spring 12' has two arms 48 and 49 which engage respective cork pads 13 on the mirror plate assembly for uniform distribution of liquid between the clear-view plate and the mirror plate.

The mirror is mounted in the vehicle by means of a ball-and-socket joint 49.

The pump 17' includes a flexible, resilient container 50 having an air-discharge pipe 27. The mirror is dimmed by a lever 51 which compresses the flexible container 50. The lever 51 is mounted on a pivot pin 53 journaled in bearings 52. The pin 53 is partly offset to clear the air-discharge pipe 27. The lever 51 consists essentially of a handle 54, and a presser plate 56 which are connected by a hinge 55. The presser plate 56 and one wall of the container 50 are adhesively bonded to each other. When the mirror is to be dimmed, the lever 51 is moved to the position 57 shown in broken lines and is arrested therein by a latch 59 which is mounted on the housing 11 by a pivot pin 58 (FIGURE 3). When the mirror is to be returned to the highly reflective state, the handle 54 is rotated on the hinge 55. Two pins 60 on the handle 54 pivot the latch 59 from its blocking position. The light-absorbing liquid 6 is forced by the spring 12' from the space between the clear-view plate 1 and mirror plate 2 into the flexible container 50. The tension of the leaf spring 12' can be adjusted by means of set screw 61.

FIG. 6 diagrammatically illustrates an arrangement in which two mirrors mounted on respective brackets 16 on the outside of a car and a mirror 48 mounted on the inside of the car are connected by flexible pipes 9 to a common pump 17.

In the modified mirror partly shown in FIGURE 8, the liquid-distribution channel 5 is constituted by a circumferential groove ground into the clear-view plate 1. The channel 5 is connected with the pipe 7 by a narrow radial groove 62 in the clear-view plate 1 which is aligned with the pipe 7. This arrangement avoids the possibility of a sealing material blocking the liquid-distribution channel. The pipe 7 is a narrow aluminum tube whose rubber mouthpiece 63 communicates with the ground groove 62.

The mirror illustrated in FIG. 7 differs from that described hereinabove with reference to FIG. 1 by a conical plate 64 provided with a central annular abutment 65 for the compression spring 12. The force of the compression spring 12 is transmitted by the outer rim of the conical plate 64 to the clear-view plate 1 and mirror plate 2, and is ultimately absorbed by the ring 10 and the mirror housing 11. The conical plate 64 greatly improves sealing. The following numerical example illustrates this fact. For a spring force of 15 kg. and a mean mirror diameter of about 9.5 cm., the spring produces a peripheral sealing force of 0.5 kg./cm. If the radial width of the seal is assumed to be 0.4 cm., a sealing pressure of 1.25 kg./sq. cm. is produced. A leakage can only occur if the liquid pressure reaches this value. However the same spring force produces in the liquid only a pressure of about 0.2 kg./sq. cm., and the mirror is capable of dimming at this or a slightly higher liquid pressure.

The pump 17", also seen in FIG. 9, consists essentially of a tubular rubber container 66 and a compressing device 67. The latter includes a rectangular housing 68, a channel 69 and a lever 70. The level 70 is rotatably mounted in a nipple 71 on the housing 68. When the lever 70 is pivoted, it shifts the channel 69 so that it compresses the tubular container 66 as shown in broken lines and the liquid 6 is discharged. The lever 70 is locked in the compressing position by the resiliency of the container 66. Only a small upward force applied to knob 44 of the lever 70 relieves the container 66. The spontaneous expansion of the container produces a negative pressure in the liquid 6, which causes return of the liquid to the pump 17" and clears the mirror. The channel 69 and the lever 70 are simultaneously returned to their initial positions.

The ends of the container 66 which project upward and downward from the housing 68 serve as pressure-limiting chambers. If the lever is actuated in an unnecessarily forceful fashion the container ends expand because the liquid cannot enter the narrow orifice 75 of the flexible pipe 9 at a sufficiently rapid rate. This feature of the container 66 avoids exceeding of the sealing pressure at the pipe 7 when dimming is initiated.

A sudden excessive rise in liquid pressure can also be avoided by making the lever 70 from a leaf spring. A resilient lever exerts a substantially constant force on the container 66 during compression.

The container 66 is held in its position in the housing 68 by two integral lugs 72 which pass through corresponding apertures in the housing and are secured by pins 73. When the pins 73 are withdrawn, the container 66 can be pulled downwards out of the housing 68. In this embodiment of the invention, all liquid-bearing elements can be completely assembled with the mirror in the factory. After mounting of the mirror on a vehicle, the container 66 is pushed into the separately mounted housing 68.

The orifice 75 of the pipe 9 extends about 10 mm. into the container 66. As long as the orifice is upwardly oriented, any air present in the container 66 cannot be pumped into the space between the clear-view plate and the mirror plate. Such air collects in the part of the container 66 situated above the liquid entry.

Flexible pipe clips 76 seal a filling and air discharge nozzle 77 and the orifice 75 to the container 66.

I claim:
1. In a rear view mirror for a vehicle, in combination:
   (a) a housing formed with an opening therein;
   (b) a transparent plate member extending across said opening and having an inner face in said housing;
   (c) a reflecting plate member in said housing and having a face opposite said inner face, said plate members having respective peripheral portions extending about the corresponding faces;
   (d) sealing means of pliable material connecting said peripheral portions for movement of said plate members between a first position in which said faces thereof are closely adjacent each other and a second position in which said faces are remote from each other, said sealing means and said plate members in said second position defining therebetween a substantially sealed chamber having one transparent wall and one reflecting wall;
   (e) a light absorbing liquid substantially filling said chamber when said plate members are in said second position thereof; and
   (f) pump means communicating with said chamber for withdrawing said liquid therefrom and for thereby moving said plate members toward said first portion, and for returning the liquid to said chamber for thereby moving said plate members from said first toward said second position thereof, whereby a dimmed reflected image appears on the surface of said transparent plate member in said second position of the plate members, and a substantially brighter image appears on said surface in said first position of the plate members,
      (1) said pump means including a pump and a conduit connecting said pump with said chamber, the internal volume of said conduit being smaller than the volume of said chamber.

2. In a mirror as set forth in claim 1, mounting means for mounting said plate members on a vehicle in a position in which said faces extend in upright planes, said opening being near the topmost portion of said chamber.

3. In a mirror as set forth in claim 1, means for maintaining substantially parallel alignment of said faces during said movements of said plate members between said positions thereof.

4. In a mirror as set forth in claim 1, yieldably resilient means permanently urging said plate members to move from said second toward said first position thereof.

5. In a mirror as set forth in claim 1, said plate members abuttingly engaging each other when in said first position thereof.

6. In a mirror as set forth in claim 1, one of said plate members being mounted on said housing in a substantially fixed position, and yieldably resilient means interposed between the other plate member and said housing for urging said other plate member toward said one plate member.

7. In a mirror as set forth in claim 6, said yieldably resilient means including a motion transmitting means in simultaneous abutting engagement with a plurality of circumferentially spaced parts of the peripheral portion of said other plate member, and a compression spring interposed between said motion transmitting means and said housing.

8. In a mirror as set forth in claim 1, said pump including a container expandable under the pressure of the pumped liquid.

9. In a mirror as set forth in claim 1, said sealing means in the first position of said plate members defining an annular channel about said faces, said channel communicating with said pump means.

10. In a mirror as set forth in claim 1, one of said plate members being formed with a circumferentially elongated groove in said face thereof adjacent said peripheral portion, said pump means communicating with said groove.

11. In a mirror as set forth in claim 1, each of said plate members having two transparent layers and a foil layer interposed between said transparent layers, respective peripheral portions of said foil layers extending beyond said transparent layers and being bonded to each other to constitute said sealing means.

12. In a mirror as set forth in claim 1, said pump means being arranged in said housing.

References Cited by the Examiner

UNITED STATES PATENTS

| | | | |
|---|---|---|---|
| 1,530,441 | 3/1925 | Thompson | 88—107 X |
| 1,913,874 | 6/1933 | Folberth et al. | 88—77 |
| 2,649,011 | 8/1953 | Black | 88—107 X |
| 3,000,262 | 9/1961 | Rabinow et al. | 88—77 |
| 3,015,253 | 1/1962 | Foreman et al. | 88—107 X |
| 3,198,070 | 8/1965 | Platzer et al. | 88—77 |

JEWELL H. PEDERSEN, *Primary Examiner.*

J. K. CORBIN, *Assistant Examiner.*